(12) United States Patent
Walters et al.

(10) Patent No.: US 12,393,978 B2
(45) Date of Patent: *Aug. 19, 2025

(54) SYSTEMS AND METHODS FOR DEBT MANAGEMENT WITH SPENDING RECOMMENDATION

(71) Applicant: Capital One Services, LLC, McLean, VA (US)

(72) Inventors: Austin Walters, Columbia, TN (US); Vincent Pham, Champaign, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 32 days.

This patent is subject to a terminal disclaimer.

(21) Appl. No.: 18/394,321

(22) Filed: Dec. 22, 2023

(65) Prior Publication Data

US 2024/0127329 A1    Apr. 18, 2024

Related U.S. Application Data

(63) Continuation of application No. 18/057,522, filed on Nov. 21, 2022, now Pat. No. 11,893,630, which is a
(Continued)

(51) Int. Cl.
*G06Q 40/02*    (2023.01)
*G06N 20/00*    (2019.01)
*G06Q 20/32*    (2012.01)

(52) U.S. Cl.
CPC ............. *G06Q 40/02* (2013.01); *G06N 20/00* (2019.01); *G06Q 20/3221* (2013.01)

(58) Field of Classification Search
CPC .......................... G06Q 40/04; G06Q 20/3221
(Continued)

(56) References Cited

U.S. PATENT DOCUMENTS

2002/0123949 A1    9/2002    Vanleeuwen
2005/0097033 A1    5/2005    Pretell et al.
(Continued)

*Primary Examiner* — Lindsay M Maguire
(74) *Attorney, Agent, or Firm* — Bookoff McAndrews, PLLC (57) ABSTRACT

A computer-implemented method may include: receiving financial information regarding a user; categorizing transaction information of the user based on the financial information; displaying the categorized transaction information of the user; receiving information regarding at least one financial preference and at least one transaction preference of the user; training a machine learning engine based on the at least one financial preference and at least one transaction preference of the user to determine one or more activities available to the user; calculating, for each of the one or more activities available to the user, an estimated influence on the at least one financial preference; displaying the estimated influence on the at least one financial preference based on a user selected one of the one or more activities available to the user; filtering the one or more activities available to the user with a positive estimated influence to the at least one financial preference; and presenting a recommendation of action relating to the one of the one or more activities available to the user, wherein the recommendation of action relating to the one of the one or more activities available to the user is presented by at least one of voice notification, application notification, tactile notification, or graphic notification.

20 Claims, 8 Drawing Sheets

Related U.S. Application Data continuation of application No. 16/923,405, filed on Jul. 8, 2020, now Pat. No. 11,532,041.

(58) Field of Classification Search
USPC .......................................................... 705/35
See application file for complete search history.

(56) References Cited

U.S. PATENT DOCUMENTS

| | | |
|---|---|---|
| 2009/0048957 A1 | 2/2009 | Celano |
| 2011/0161155 A1 | 6/2011 | Wilhelm et al. |
| 2017/0255793 A1 | 9/2017 | Caldwell |
| 2018/0218446 A1 | 8/2018 | Ries et al. |
| 2019/0108585 A1 | 4/2019 | Caldwell |
| 2019/0114643 A1 | 4/2019 | Dewitt et al. |
| 2019/0116172 A1 | 4/2019 | Caldwell |

SYSTEMS AND METHODS FOR DEBT MANAGEMENT WITH SPENDING RECOMMENDATION

CROSS-REFERENCE TO RELATED APPLICATION(S)

This patent application is a continuation of, and claims the benefit of priority to, U.S. Nonprovisional patent application Ser. No. 18/057,522, filed on Nov. 21, 2022, which is a continuation of U.S. Nonprovisional patent application Ser. No. 16/923,405, filed on Jul. 8, 2020, now U.S. Pat. No. 11,532,041, all of which are incorporated by reference herein in their entireties.

TECHNICAL FIELD

Various embodiments of the present disclosure relate generally to providing financial management services, and more specifically to artificial intelligence-based financial management based upon one or more parameters.

BACKGROUND

When it comes to financial management, or more specifically to choosing which financial management approach is best, the enormous number of available choices often intimidates and confuses the public. For example, available financial management tools might suggest that an individual (e.g., consumer) pay extra every month, pay the minimum on one loan in order to focus the payments on another loan, and/or use savings to pay down debt. Many of these options are mutually exclusive and choosing the best option can be difficult for many consumers. Often financial management tools exclusively focus on how to pay down (e.g., reduce) or pay off current debt(s) or other obligations of a consumer, without considering the overall short and long-term fiscal effects on the consumer.

Furthermore, many of the digital tools dispensing financial advice do not take into account all the options available to the consumer that could satisfy the consumer's need. Other models fail to consider exactly what type of financial goals the consumer has in mind. Additionally, available financial management models fail to provide adaptive dynamic recommendations to the consumer based in part on self-selected (e.g., consumer-selected) financial management criteria.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, non-transitory computer readable media, systems, and methods are disclosed for determining one or more financial management recommendations (e.g. debt management recommendations). Each of the examples disclosed herein may include one or more of the features described in connection with any of the other disclosed examples.

In one example, a computer-implemented method may be used for providing a debt management recommendation. The method may include: receiving, by one or more processors, financial information regarding a user; categorizing, by the one or more processors, transaction information of the user based on the financial information; displaying, by the one or more processors, via a user interface of a user device associated with the user, the categorized transaction information of the user; receiving, by the one or more processors, information regarding at least one financial preference and at least one transaction preference of the user via the user device; training, by the one or more processors, a machine learning engine based on the at least one financial preference and at least one transaction preference of the user to determine one or more activities available to the user; calculating, by the one or more processors, for each of the one or more activities available to the user, an estimated influence on the at least one financial preference; displaying, by the one or more processors, via the user interface of the user device, the estimated influence on the at least one financial preference based on a user selected one of the one or more activities available to the user; filtering, by the one or more processors, the one or more activities available to the user with a positive estimated influence to the at least one financial preference; and presenting, by the one or more processors, via the user interface of the user device, a recommendation of action relating to the one of the one or more activities available to the user, wherein the recommendation of action relating to the one of the one or more activities available to the user is presented by at least one of voice notification, application notification, tactile notification, or graphic notification.

According to still another aspect of the disclosure, a computer system for providing a debt management recommendation may include a memory having processor-readable instructions stored therein and a processor configured to access the memory and execute the processor-readable instructions to perform a plurality of functions. The functions may include: receiving financial information regarding a user; categorizing transaction information of the user based on the financial information; displaying via a user interface of a user device associated with the user, the categorized transaction information of the user; receiving information regarding at least one financial preference and at least one transaction preference of the user via the user device; training a machine learning engine based on the at least one financial preference and at least one transaction preference of the user to determine one or more activities available to the user; calculating for each of the one or more activities available to the user, an estimated influence on the at least one financial preference; displaying via the user interface of the user device, the estimated influence on the at least one financial preference based on a user selected one of the one or more activities available to the user; filtering the one or more activities available to the user with a positive estimated influence to the at least one financial preference; and presenting on the user interface of the user device, a recommendation of action relating to the one of the one or more activities available to the user, wherein the recommendation of action relating to the one of the one or more activities available to the user is presented by at least one of voice notification, application notification, tactile notification, or graphic notification.

According to another aspect of the disclosure, a computer-implemented method may be used for providing a debt management recommendation. The method may include: receiving, by one or more processors, financial information regarding a user; categorizing, by the one or more processors, a transaction information of the user based on the financial information; displaying, by the one or more processors, on a display of a user device, the categorized transaction information of the user; requesting, by the one or more processors, the user to enter information regarding at least one financial preference and at least one transaction preference using the user device; receiving, by the one or more processors, information regarding the at least one financial preference from the user; receiving, by the one or more processors, information regarding the at least one transaction preference from the user; assigning, by the one or more processors, an expected value to the at least one transaction preference; training, by the one or more processors, a machine learning engine based on the at least one financial preference and at least one transaction preference of the user to determine one or more activities available to the user; calculating, by the one or more processors, for each of the one or more activities available to the user, an estimated influence on the at least one financial preference; filtering, by the one or more processors, the one or more activities available to the user with a positive estimated influence on the at least one financial preference; calculating, by the one or more processors, a value of satisfaction based on a monetary cost of the one or more activities available to the user with positive estimated influence and the expected value; ranking, by the one or more processors, the one or more activities available to the user with positive estimated influence based on the value of satisfaction; displaying, by the one or more processors, via the display of the user device, the one or more activities available to the user with positive estimated influence; and recommending, by the one or more processors, one of the one or more activities available to the user with positive estimated influence based on the ranking, wherein the recommendation is presented by at least one of a voice notification, application notification, tactile notification, or graphic notification.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In this disclosure, the term "computer system" generally encompasses any device or combination of devices, each device having at least one processor that executes instructions from a memory medium. Additionally, a computer system may be included as a part of another computer system. As used herein, the term "merchant" may indicate, and may be used interchangeably with, a merchant of items or services, a seller of items or services, a vendor of items or services, etc. The term "consumer" may indicate, and may be used interchangeably with, a user, a customer, a potential customer, buyer, person attempting to obtain a lease, ownership, ownership share, etc., of an item and/or service. The term "product" as used herein may refer to goods, services, property, rights, other things of value that may be transferred, or combinations thereof.

In general, the present disclosure provides methods and systems for providing consumers with financial management tools that evaluate a consumer's past transactions and perform simulations to determine one or more recommendations to assist the consumer in achieving a consumer-specific goal. For example, the recommendation may suggest a limit on spending for a specific period of time or on certain items/services so as to assist the consumer in achieving their financial goals. As described above, a need exists for a financial management tool that provides adaptive dynamic recommendations to consumers based on the preferences of the consumers (e.g., consumer-specific preferences). The present disclosure describes methods and systems to determine the spending patterns and preference of consumers, and using machine learning and/or artificial intelligence, predicting and recommending future spending (or limits on spending) based on the preferences of the consumers so as to assist the consumers in meeting financial goals (e.g., consumer-specific financial goals).

Figure 1:
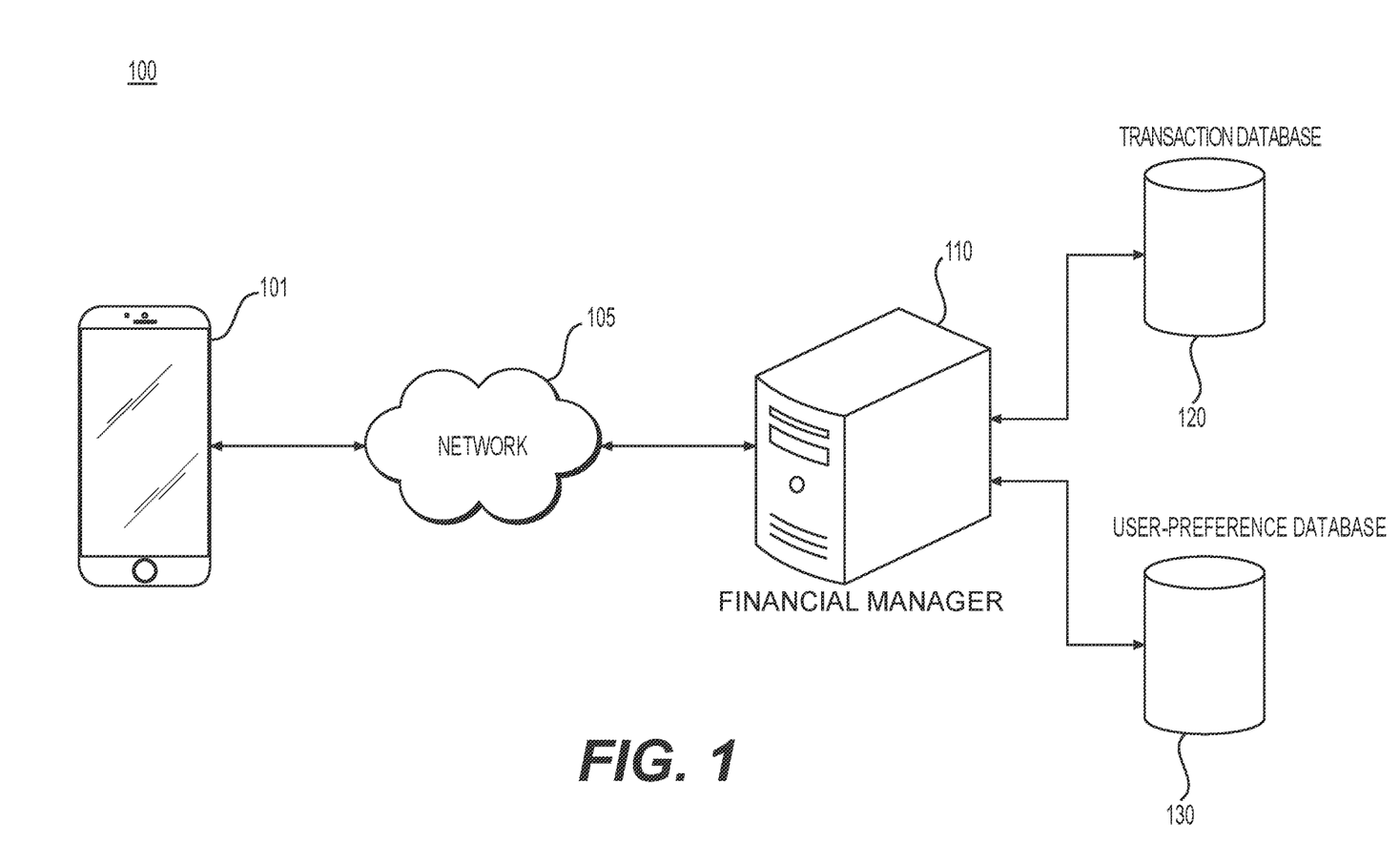
FIG. 1 depicts an exemplary environment in which systems, methods and other aspects of the present disclosure may be implemented.

Referring now to the appended drawings, FIG. 1 depicts an exemplary environment 100 in which systems, methods, and other aspects of the present disclosure may be implemented. The exemplary system environment 100 may include a user device 101, a network 105, a financial manager 110, a transaction database 120, and a user-preference database 130. Various systems and devices of environment 100 may communicate via network 105 in any arrangement.

In various embodiments, network 105 may be a wide area network ("WAN"), a local area network ("LAN"), personal area network ("PAN"), or the like. In some embodiments, network 105 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web").

While FIG. 1 depicts the various systems as physically separate and communicating across network 105, in various embodiments features of certain systems, such as the financial manager 110, transaction database 120, and/or user-preference database 130, may be incorporated partially or completely into any of the other systems of FIG. 1. For example, in some embodiments, transaction database 120 and/or user-preference database 130 may be incorporated into financial manager 110.

User device 101 may be operated by a user (e.g., consumer) for communication with financial manager 110. In such a manner, user device 101 may be considered a device associated with a user. Non-limiting examples of user device 101 may include smartphones, wearable computing devices, tablet computers, laptops, and desktop computers, etc.

Financial manager 110 may be an issuer of financial instruments. An issuer may be an entity such as a bank, credit card issuer, merchant services providers, or other types of financial service entity. In some embodiments, the financial manager 110 may also be a third-party service provider that communicates with financial providers (e.g., banks, credit card companies, etc.) on the behalf of users (e.g., consumers) to receive transaction and/or spending data of the users.

The transaction database 120 may store previous (e.g., historical) transaction data between merchants and users (e.g., consumers). Transaction data may include, for example, merchant identification information, date and/or time of the transaction, awards/benefits/rewards associated with completion of the transaction, and information identifying or otherwise describing the products or services purchased during the transaction.

User-preference database 130 may store information regarding the consumer, such as spending history, account balance, geographic location data, available credit, credit-to-debt ratio, credit history and/or score, credit segmentation, bankruptcy history, income amount, spending habits, age group, demographic information, and/or spending preferences.

Figure 2:
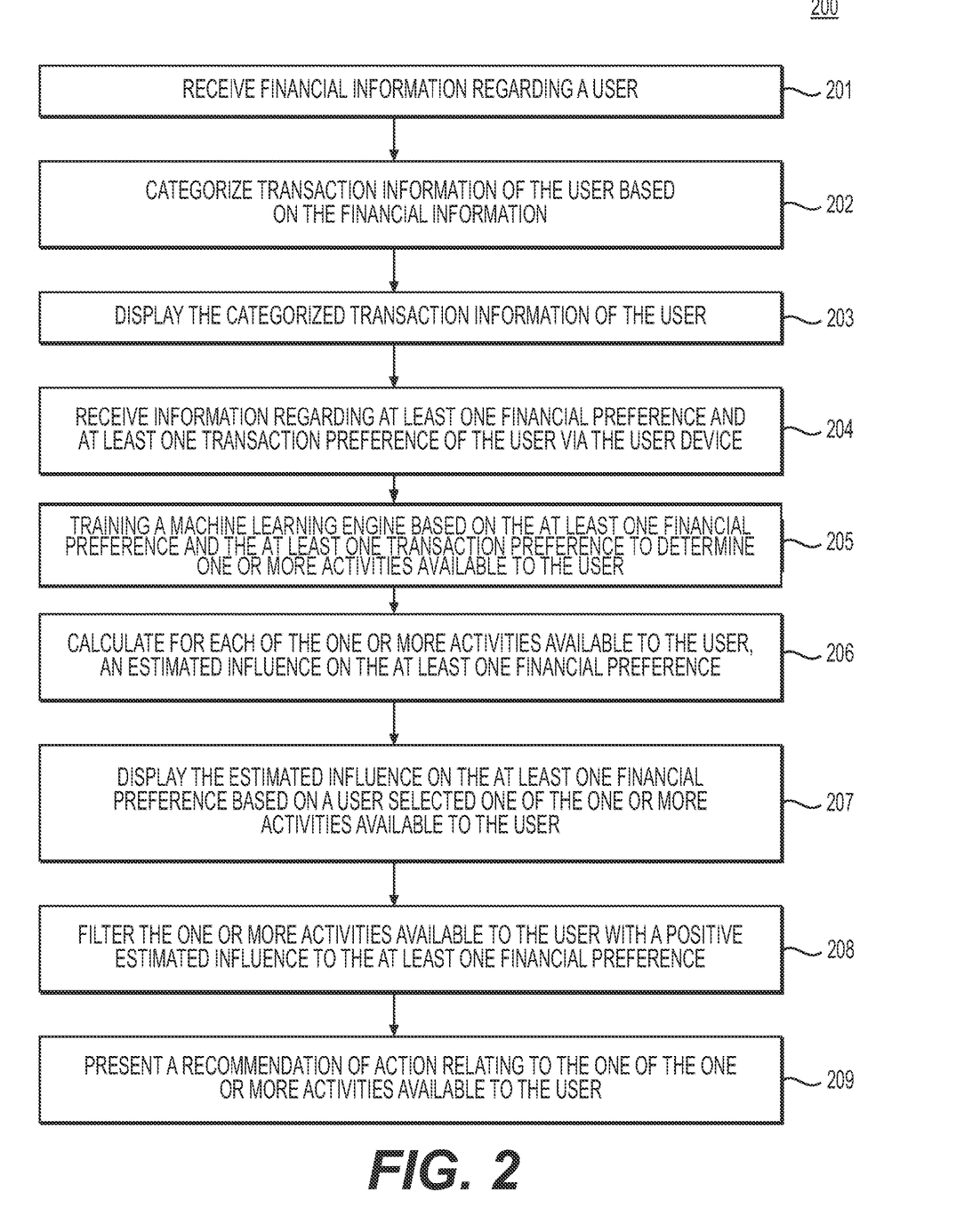
FIGS. 2-3 depict exemplary flow charts for providing a debt management recommendation, according to one or more embodiments.

FIG. 2 depicts an exemplary flow chart 200 for providing a debt management recommendation, according to one or more embodiments. The flow chart 200 may begin at step 201 wherein financial information regarding a user is received from the user. The financial information may be received by the financial manager 110 as manual inputs from the user via user device 101, or may be received by the financial manager 110 by the user entering/providing their log-in credentials for financial entities (e.g., banks or credit card provider). Upon the user entering/providing the log-in credentials, the financial manager 110 may retrieve the financial information of the user from the financial entities. The financial information may include previous transactions completed by the user (e.g., historical transaction data) and the information may be retrieved (e.g., pulled, obtained, collected, or otherwise received) from the transaction database 120. The financial information may include information such as merchant identification information, data and/or time of the transaction, awards/benefits/rewards associated with completion of the transaction, and/or information identifying or otherwise describing the products or services purchased during the transaction. The financial information may also include any income information of the user and/or any expenses incurred by the user (e.g., utilities, fixed expenses, and estimated or average unfixed expenses, such as groceries, etc.).

At step 202, the received financial information may be categorized. For example, the received financial information may be parsed by the financial manager 110 to determine a category of the transaction information. The category of the transaction may be determined by the merchant. For example, each merchant may be assigned a category code (e.g., groceries, gas, entertainment) and the transactions may be categorized by the merchant category code. In some embodiments, transaction information may be categorized by the type of product purchased. For example, transactions at a movie theater may be categorized as entertainment, transactions at a restaurant may be categorized as dinning, and transactions related to rent or mortgage may be categorized as housing. Other categories of transactions may include travel, groceries, utilities, fitness, health, giving, medical care, dependent care, insurance, vehicle/automotive, subscriptions, taxes, personal loan payment, and/or miscellaneous, etc.

At step 203, the categorized transaction information may be displayed to the user via the user device 101. For example, the financial manager 110 may transmit data to the user device 101 causing the user device 101 to display the categorized transaction information. The categorized transaction information may be displayed in an application executed on the user device 101, on a web browser, or may be displayed to the user in an email. The categorized transaction information may be displayed in one or many formats, for example, the categorized transaction information may be displayed as a bar graph, a pie graph, a line graph, or any other representation formats.

At step 204, the financial manager 110 may transmit a request to the user device 101, requesting that the user provide information regarding at least one financial preference and at least one transaction preference. The user may utilize the user device 101 to respond to the request, and as such, the financial manager 110 may receive information regarding at least one financial preference and at least one transaction preference of the user from the user device 101. The at least one financial preference may be related to a financial goal of the user, such as pay off debt as soon as possible, pay off debt over a predetermined time period, and/or increase savings. The at least one transaction preference may be related to a spending preference of the user. For example, the user may receive maximum enjoyment in watching movies, and less enjoyment in travel. Therefore, the user may indicate higher preference in spending for movies (e.g., entertainment) and related expenses, and a lower preference in spending for travel and related expenses.

At step 205, the financial manager 110 may feed the financial preference and the transaction preferences of users to a machine learning engine to train the engine to determine one or more activities available to users. The machine learning engine may be located, e.g., at the financial manager 110, or may be located remotely from the financial manager 110 but connected to the financial manager 110 via the network 105. Any one of various machine learning models may be trained and utilized for this purpose, such as deep learning models, neural networks, a random forest model, gradient boosted machine (GBM), a Naive Bayes model, a linear or logistic regression model, a decision tree, or any other suitable machine learning model. For example, the financial manager 110 may use one or more prediction models, such as one model for all user financial information, financial preferences, and transaction preferences, or individual models for each user and each financial preference and transaction preference. The machine learning model(s) may be trained to recognize different activities based on the transaction information supplied by the user via the user device 101 to the financial manager 110 (step 204), the user's previous purchase patterns, and/or preferences submitted by the user. For example, the financial manager 110 may parse the transaction information to determine that the user has conducted transactions at a movie theater. In another embodiment, the transaction information at a movie theater may include the title of the movie and/or the genre of the movie. The financial manager 110 may utilize the parsed transaction information to establish a user preferred activity of movie watching. Similarly, the financial manager 110 may also parse transaction information to determine specific dining establishments or types of food and a user's preference for dining may be established. Once a user's preference has been established, then a query may be performed by the financial manager 110 on movie showings, dining establishments, or any other activities available to the user. A list of all available activities may be collected from merchants inputting the activities into the financial manager 110, or may be collected from social media networks. Accordingly, once user financial preferences and transaction preferences are recognized, the machine learning model(s) may be able to determine a list of all available activities. The activities may also be based on the amount of disposable income the user has available. Disposable income may be the amount of income the user has available after subtracting necessary expenses from the user's total income.

At step 206, for each of the one or more activities available to the user, the financial manager 110 may calculate an estimated influence on the at least one financial preference. For example, if the user has indicated the financial preference of paying off debt in 10 months, then a calculation may be made to determine if going to the movies or dining at a restaurant will positively or negatively influence the financial preference. The user may indicate to the financial manager 110 at step 204 a minimum amount of income to be set aside for activities so that the financial manager 110 does not recommend using all available disposable income for debt payoff. The calculation may be made using various algorithms. In one embodiment, a Monte Carlo tree search (MCTS) algorithm may be used to determine the influence of the one or more activities on the financial preference. The MCTS algorithm may step through multiple moves to determine the influence of each of the activities. In other words, the MCTS algorithm may analyze multiple rounds of potential actions/consequences of such actions that may occur in relation to a user exploiting an activity of the one or more activities. A first move taken by the algorithm may include a selecting process. The selecting process may select a node of the tree, where each node may be a particular activity (e.g., purchase groceries). After the selecting process, the algorithm may perform an expanding process to increase the options further by expanding the selected node and creating a plurality of child nodes. The algorithm may use previously conducted transactions to populate the plurality of child nodes and these child nodes may represent other transactions that may be conducted by the user. The next step performed by the MCTS may be a simulation step, where a next child node may be iteratively selected, and a simulation may be performed to see the influence of the transaction represented by the node on the financial preference of the user. Finally, a back propagation process may be performed to update the current node based on the influences of the simulated transactions. As an example of the operation of the MCTS algorithm, a user may want to know if he or she can spend $15 to go to a concert while still meeting the financial preference of the user. The MCTS may then expand to include all other spending a user may conduct. For example, a user may have spending for rent (e.g., housing), spending for utilities, and spending for groceries. The MCTS may then perform a simulation to determine the influence of all the spending transactions on the financial preference. For example, by spending the $15 to go to a concert, and with all the other spending that the user may conduct, the user may not have enough disposal income to pay down a debt. The MCTS then may back propagate and update the transactions to inform the user that by spending the $15 to go to a concert, the user may negatively influence the financial preference of the user.

At step 207, a display may be presented to the user via the user device 101 to indicate the estimated influence on the at least one financial preference based on a selection of the one or more available activities by the user. For example, the financial manager 110 may transmit data to the user device 101 configured to cause display of a list of available activities, and display whether each of the activities will have a positive or negative influence on the at least one financial preference. The list of available activities may further be updated based on the user's performance of an available activity. The list of available activities may also be displayed so as to indicate the influence on the at least one financial preference. For example, the available activities may be displayed in a ranked order from most positive influence to most negative influence. The available activities may also be displayed or highlighted in different color. For example, activities with positive influence may be displayed in green while activities with negative influences may be displayed in red. The activities may also be displayed with a thumbs up or thumbs down icon or be displayed in bolded and/or enlarged text to indicate the influence. Any available display arrangement may be used without departing from the scope of this disclosure.

At step 208, the financial manager 110 may filter the one or more activities available to the user to only contain activities that will have a positive influence on the at least one financial preference. At step 209, the financial manager 110 may present a recommendation of action relating to the one or more activities available to the user. The recommendation of action may be for the user to conduct the activity or may be a recommendation for the user to not conduct the activity. The recommendation of action may be displayed by highlighting or color coding the one or more available activities on a display screen via a graphical user interface. The display may include any device capable of visual or tactile presentation of data and images in a form intelligible to a user. For example, the display may present information dynamically in a visual medium. The recommendation of action may also be a display of an available activity that has the most positive influence to the financial preference of the user. Alternatively, or in addition to the graphic notifications described above, the financial manager 110 may present the recommendation of action to the user by a voice notification that is audible to the user, a tactile notification, or by any other non-graphic method of notification. In some embodiments, the user may be able to change the notification format according to the user's preferences. Non-limiting examples of the display may include a cathode ray tube, a liquid crystal display, a light emitting display, a plasma display, etc. In some embodiments, the display may also accept input, for example, the display may include a touch screen where information may be entered by selecting one or more options presented on the display. Selecting an option may be accomplished by touching an area of the display or using a mouse. In this manner, a user may select, modify, or change the list of activities available to the user according to a user preference.

Figure 3:
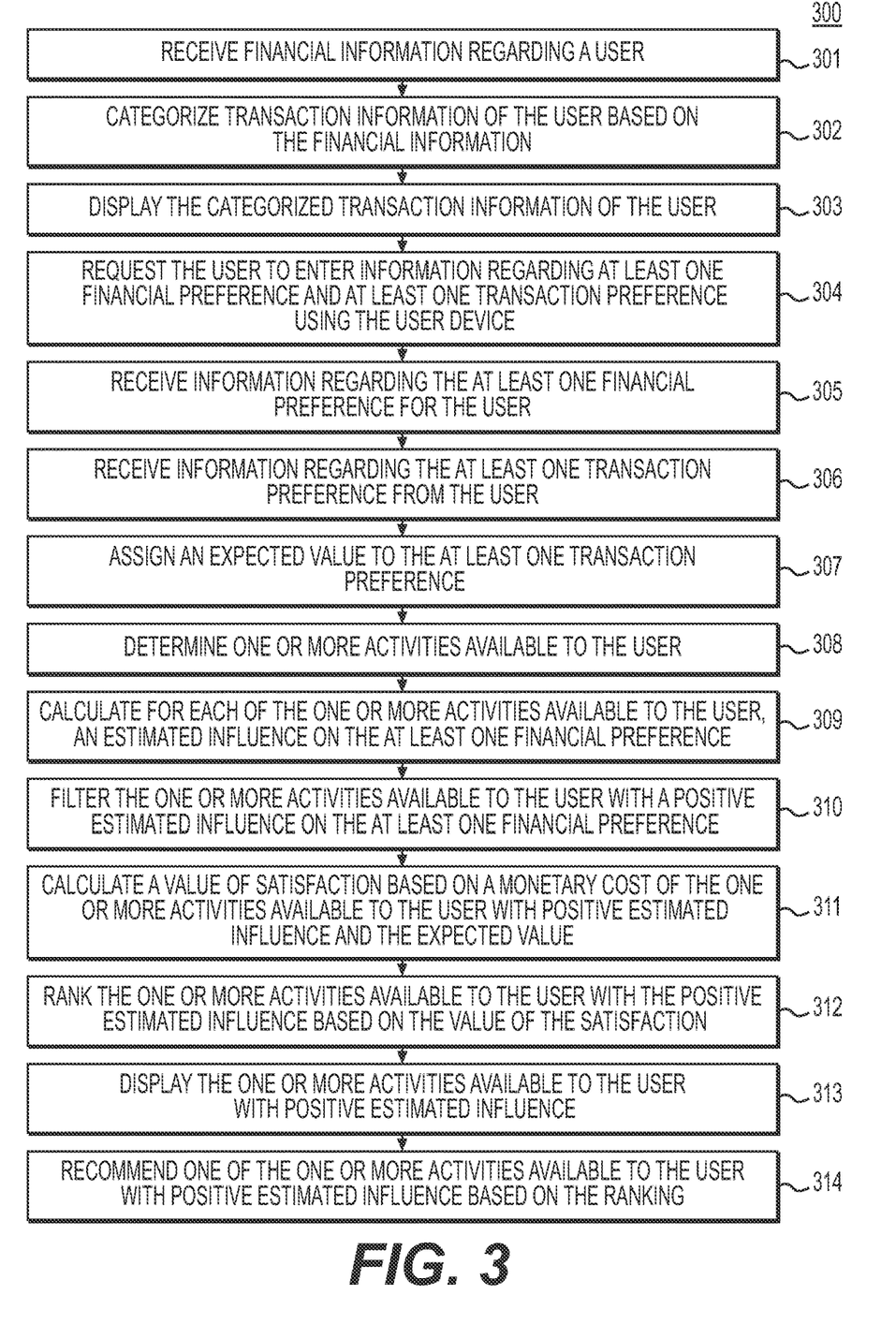

FIG. 3 depicts another exemplary embodiment flow chart 300 for providing a debt management recommendation, according to one or more embodiments. The flow chart 300 may begin at step 301 wherein financial information regarding a user is received from the user. The financial information may include previous transactions completed by the user and the information may be pulled from the transaction database 120. The financial information may include information such as merchant identification information, data and time of the transaction, and information identifying or otherwise describing the items purchased during the transaction. The financial information may also include any income of the user and any necessary expenses (e.g., utilities, and groceries). The financial information may be received by the financial manager 110 as manual inputs from the user via user device 101, or may be received by the financial manager 110 by the user entering their log-in credentials to financial entities (e.g., banks or credit card provider). Upon providing the log-in credentials, the financial manager 110 may retrieve the financial information of the user from the financial entities. At step 302, the received financial information may be parsed to retrieve transaction information of the user and categorize the retrieved transaction information. The category of the transaction may be determined by the merchant. For example, each merchant may be assigned a category code (e.g., groceries, gas, entertainment) and the transaction may be categorized by the merchant category code. In come embodiments, transaction information may be categorized by the type of product purchased. For example, transactions at a movie theater may be categorized as entertainment, transactions at a restaurant may be categorized as dinning, and transactions related to rent or mortgage may be categorized as mortgage/rent. Other categories of transactions may include travel, groceries, utilities, fitness, or miscellaneous. At step 303, the categorized transaction information may be displayed to the user via the user device 101. For example, the financial manager 110 may transmit data to the user device 101 causing the user device 101 to display the categorized transaction information. The categorized transaction information may be displayed in an application executed on the user device 101, on a web browser, or may be displayed to the user in an email. The categorized transaction information may be displayed in one or many formats, for example, the categories may be displays as a bar graph, a pie graph, a line graph, or any other representation formats.

At step 304, the financial manager 110 may transmit a request to the user device 101 requesting that the user provide information regarding at least one financial preference and at least one transaction preference. The user may utilize the user device 101 to respond to the request, and as such the financial manager 110 may receive information regarding at least one financial preference and at least one transaction preference of the user from the user device 101. The at least one financial preference may be related to the financial goal of the user, such as pay off debt as soon as possible, or pay off debt over a predetermined time period, and/or increase savings. The at least one transaction preference may be related to the spending preference of the user. For example, the user may receive maximum enjoyment in watching movies, and less enjoyment in travel. Therefore the user may indicate high preference in spending for movies and related expenses and lower preference in spending for travel and related expenses. At steps 305 and 306, the response from the user regarding the financial preference and transaction preference, respectively, may be received.

At step 307, an expected value may be assigned to the at least one transaction preference. The expected value may vary based on the preference of the user. For example, if the user indicates a high preference for a certain activity, then an expected value of 1 may be assigned to transactions related to that activity. If the user indicates a medium preference for a certain activity, then an expected value of 0.5 may be assigned to transactions related to that activity. Furthermore, if the user indicates a low preference for a certain activity, then an expected value of 0.25 may be assigned to transactions related to that activity. While values of "1", "0.5", and "0.25" are used herein for high preference, medium preference, and low preference, respectively, any other quantitative or qualitative value may be used for the expected value to distinguish the difference between high preference, medium preference, and low preference. At step 308, the financial manager 110 may determine one or more activities available to the user. The activities may be based on the transaction information supplied by the user via the user device 101 to the financial manager 110, the user's previous purchase patterns, and/or preferences submitted by the user. For example, the financial manager 110 may parse the transaction information to determine that the user has conducted transactions at a movie theater. In another embodiment, the transaction information at a movie theater may include the title of the movie and/or the genre of the movie. The financial manager 110 may utilize the parsed transaction information to establish a user preferred activity of movie watching. Similarly, the financial manager 110 may also parse transaction information to determine specific dining establishments or types of food and a user's preference for dining may be established. Once a user's preference has been established, then a query may be performed by the financial manager 110 on movie showings, or dining establishments available to the user. The activities in some embodiments may thus be determined based on the user transaction preference information received at step 305, the financial information received at step 301, or both the transaction preference information and the financial information. The activities may also be based on the amount of disposable income the user has available. A list of all available activities may be collected from merchants inputting the activities into the financial manager 110, or may be collected from social media networks.

At step 309, for each of the activities available for the user, the financial manager 110 may calculate an estimated influence on the at least one financial preference. For example, if the user has indicated the financial preference of paying off debt in 10 months, then a calculation may be made to determine if going to the movies or dining at a restaurant will positively or negatively influence the financial preference. The user may indicate to the financial manager 110 at step 204 a minimum amount of income to be set aside for activities so that the financial manager 110 does not recommend using all available disposable income for debt payoff. The calculation may be made using various algorithms. In one embodiment, a Monte Carlo tree search (MCTS) algorithm may be used to determine the influence on the financial preference. Details of the MCTS algorithm are disclosed elsewhere herein.

At step 310, the financial manager 110 may filter the one or more activities available to the user to only contain activities that will have a positive influence on the at least one financial preference. At step 311, a calculation may be performed by the financial manager 101 to determine a value of satisfaction based on a monetary cost of the one or more activities available to the user with positive estimated influence and the expected value of the activities. For example, if the user has indicated a high preference for going to concerts, then transactions related to concerts may be assigned an expected value of 1. If the user has indicated a low preference for dining, then transactions related to dining may be assigned an expected value of 0.25. If available activities exist for concert at a cost of $20 and activities exist for dining at a cost of $20, then the value of satisfaction for the user going to the concert is $20 while the value of satisfaction for the user going to dining is $5. In other words, based on the transaction preferences of the user, the user may gain $20 worth of satisfaction by going to the concert while only gaining $5 worth of satisfaction by going to dining, even though both activities will cost the user the same amount financially at $20.

At step 312, the financial manager 110 may rank the one or more activities available to the user with positive estimated influence based on the value of satisfaction. The ranking may be in increasing or decreasing order of value of satisfaction. At step 313, the ranked one or more activities available to the user with positive estimated influence may be transmitted by the financial manager 110 causing the user device 101 to display the ranked activities. At step 314, the financial manager 110 may present a recommendation of the one or more activities available to the user with positive estimated influence to the user. The financial manager 110 may recommend the activity with the highest value of satisfaction, or may recommend activities with value of satisfaction exceeding a threshold value set by the user or by the financial manager 110. The recommended activity may be displayed by highlighting the activity or color coding the activity in a different color than the non-recommended activities. The threshold value may be based on the financial preference of the user or may be based on other preferences of the user. Similarly, the financial manager 110 may remove an activity from a list of available activities to the user if that activity has a value of satisfaction that falls below the threshold. Additionally, activities with varying value of satisfaction may be recommended for the user to make a selection.

FIGS. 4A-4D depict exemplary user interfaces for providing a debt management recommendation, according to one or more embodiments. While FIGS. 4A-4D may depict an application for a mobile device, the interface may also be available on other computing devices such as desktop or laptop computers. Interface 400A may depict an exemplary main, or home, view of the user interface. Interface 400A may include a navigation bar 405, a financial preference view 410, transaction categories view 415, activities recommendations view 420, and recent transactions view 425. The user may interface with the navigation bar 405 to navigate to the different functions of the application. Financial preference view 410 may display the financial information of the user as well as the financial preference of the user. For example, view 410 may display to the user the total amount of outstanding debt, and the user's preference to pay off the debt in a certain time period. Financial preference view 410 may also be updated after the user performs an activity, for example, one of the recommended activities available to the user discussed above. The transaction categories 415 may display the categories of the transaction information of the user, such as categories of spending and amount of spending in each category. While categories are displayed for "Entertainment", "Dining", "Travel", "Mortgage", and "Misc.", other categories of spending may also be included. Activities recommendations 420 may display activities to the user that have positive influence on financial preference of the user. For example, the user may spend up to $15 on dining and will meet the financial preference of paying off the debt in 11 months. Recent transactions view 425 may display a list of recent transactions completed by the user.

Figure 4A:
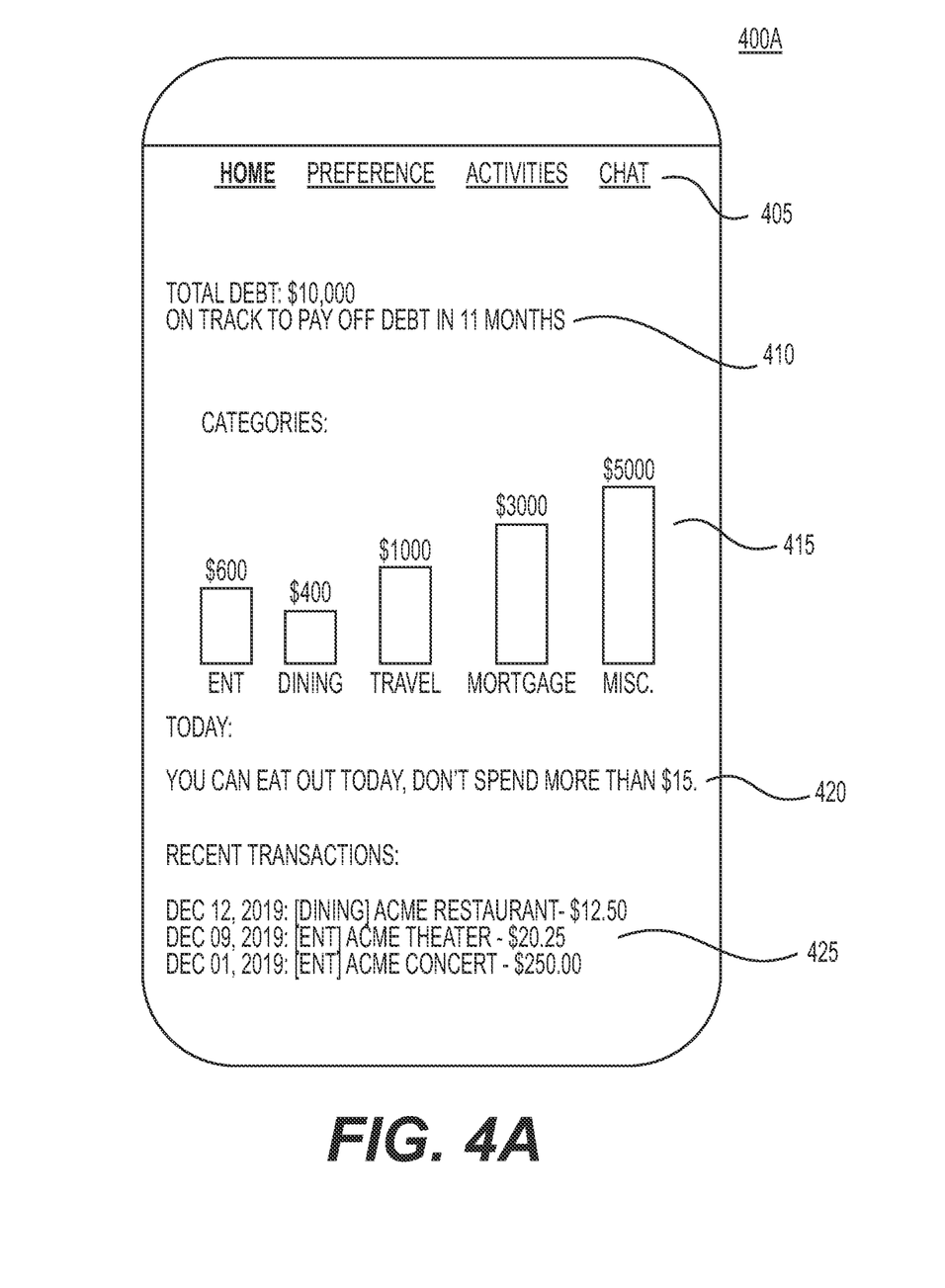
FIGS. 4A-4D depict exemplary user interfaces for providing a debt management recommendation, according to one or more embodiments.
Figure 4B:
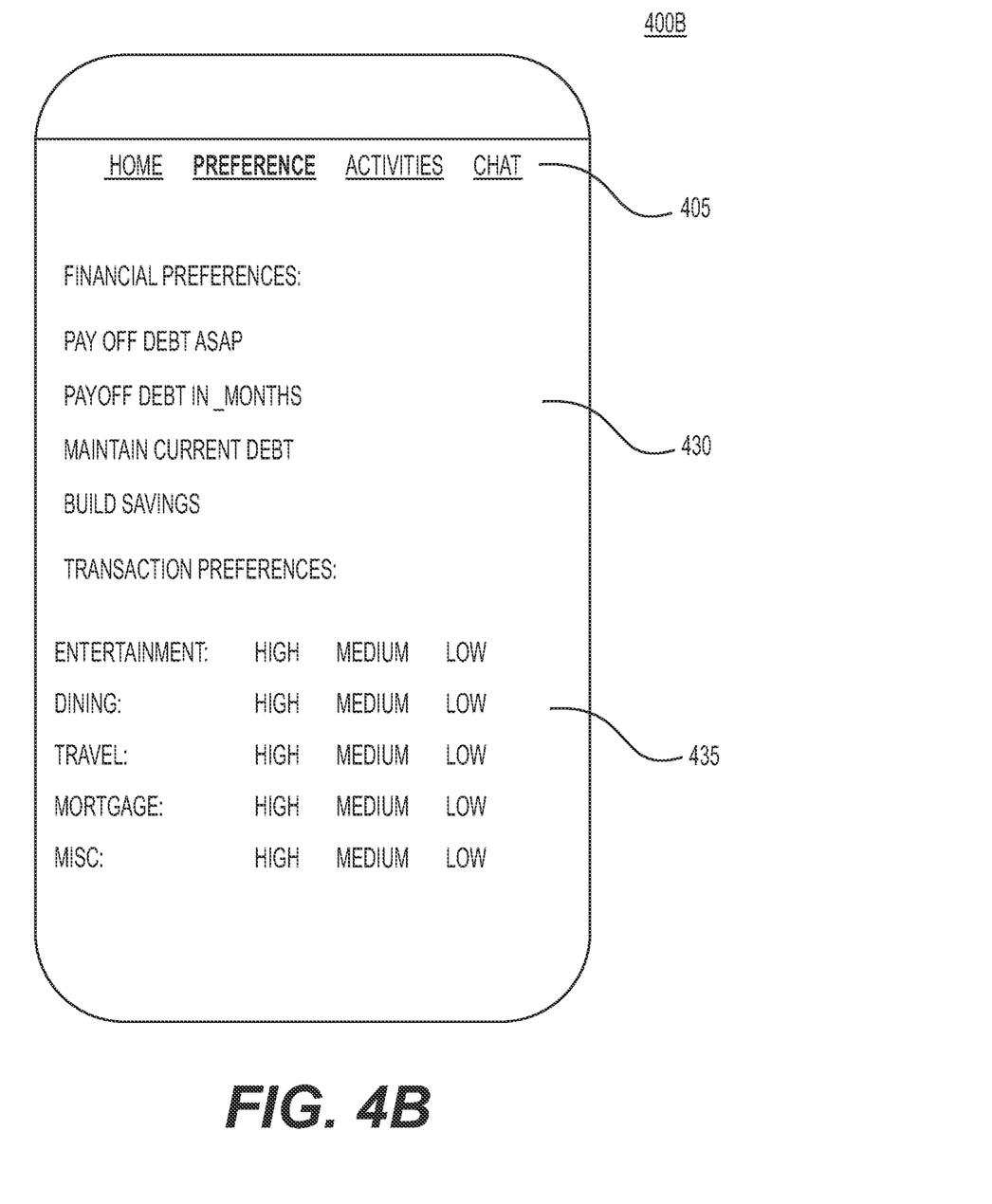

Interface 400B may depict the preference page of the application. The user may navigate to the preference page by interacting with the navigation bar 405. Interface 400B may include the financial preferences setting 430, and transaction preferences setting 435. The preference setting page may allow the user to input information related to financial preferences and transaction preferences. The financial preferences setting 430 may allow the user to indicate a preference or goal. For example, the user may be able to select to pay off all debt as soon as possible, pay off a specified debt as soon as possible, pay off debt in a certain amount of time, maintain current debt, and/or build savings. Other financial preferences may also be included in setting 430. The financial preferences selected by the user may influences the available activities recommended to the user by the financial manager 110. For example, if the user selects to pay off all debt as soon as possible, then the financial manager 110 may recommend the user to put all disposable income into debt payment instead of activities. If the user selects to pay off all debt in a certain amount of time, then the user may have disposable income for activities recommended by the financial manager 110. Transaction preferences setting 435 may allow the user to indicate a preference of spending. For example, the user may receive the greatest enjoyment from entertainment, then the user may select high preference for entertainment transactions. Transaction preferences may be depicted as high, medium, or low, however, transaction preferences may also be depicted as a numerical value such as from 0-10.

Figure 4C:
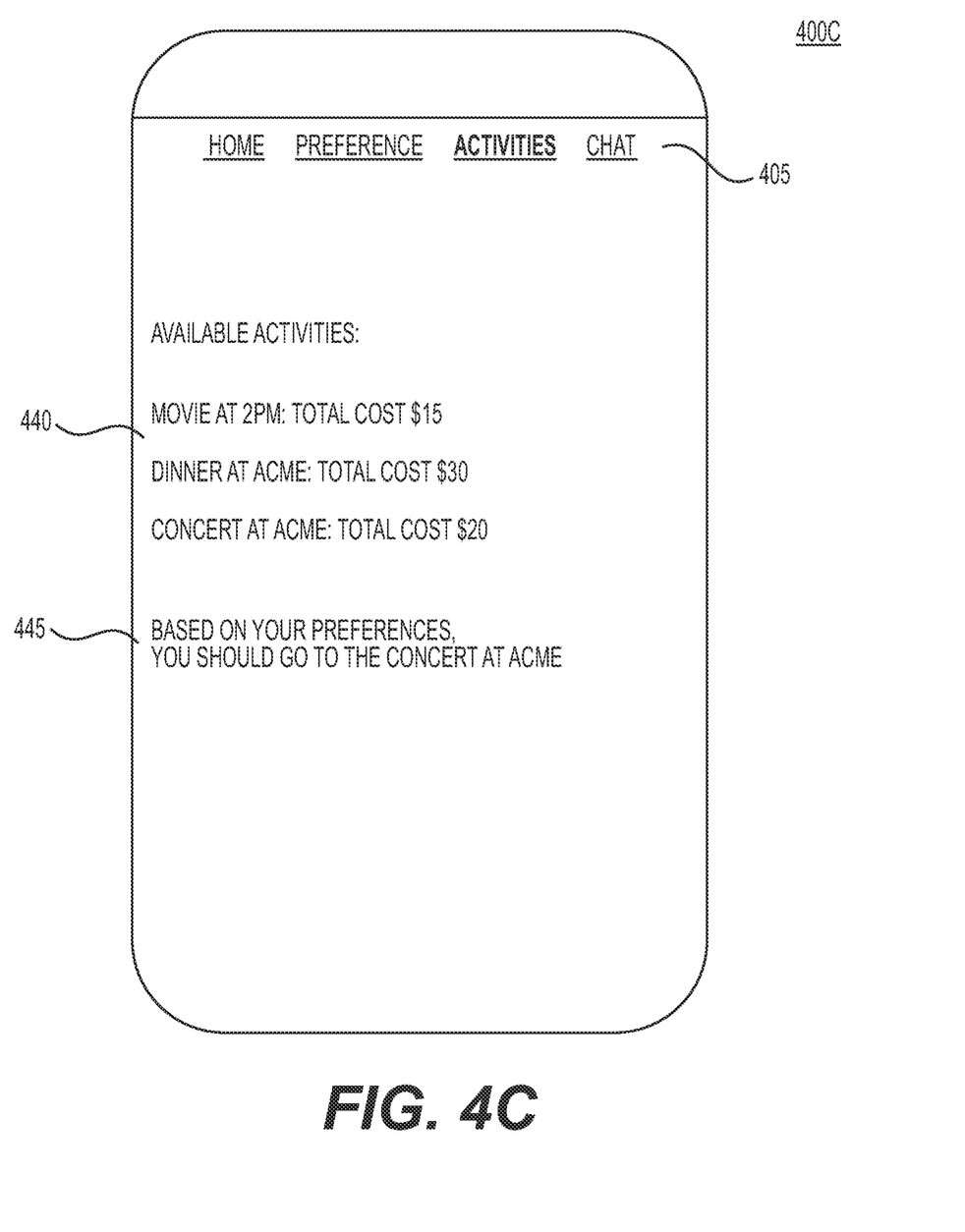

Interface 400C may depict the activities recommendation page of the application. The user may navigate to the activities recommendation page by interacting with the navigation bar 405. Interface 400C may include activities display 440 and recommendation display 445. Activities display 440 may display a list of available activities to the user. The list of activities may be activities determined to have a positive influence on the financial preference of the user. The activities display 440 may display the list in a sorted order, or may display the list based on preference of the user. The recommendation display 445 may display a recommended activity from the list of available activities. The recommended activity may be based on the value of satisfaction of each available activity and/or it may be based on the cost of the available activity. Alternatively, the recommended activity may be based on the frequency of activities previously conducted by the user.

Figure 4D:
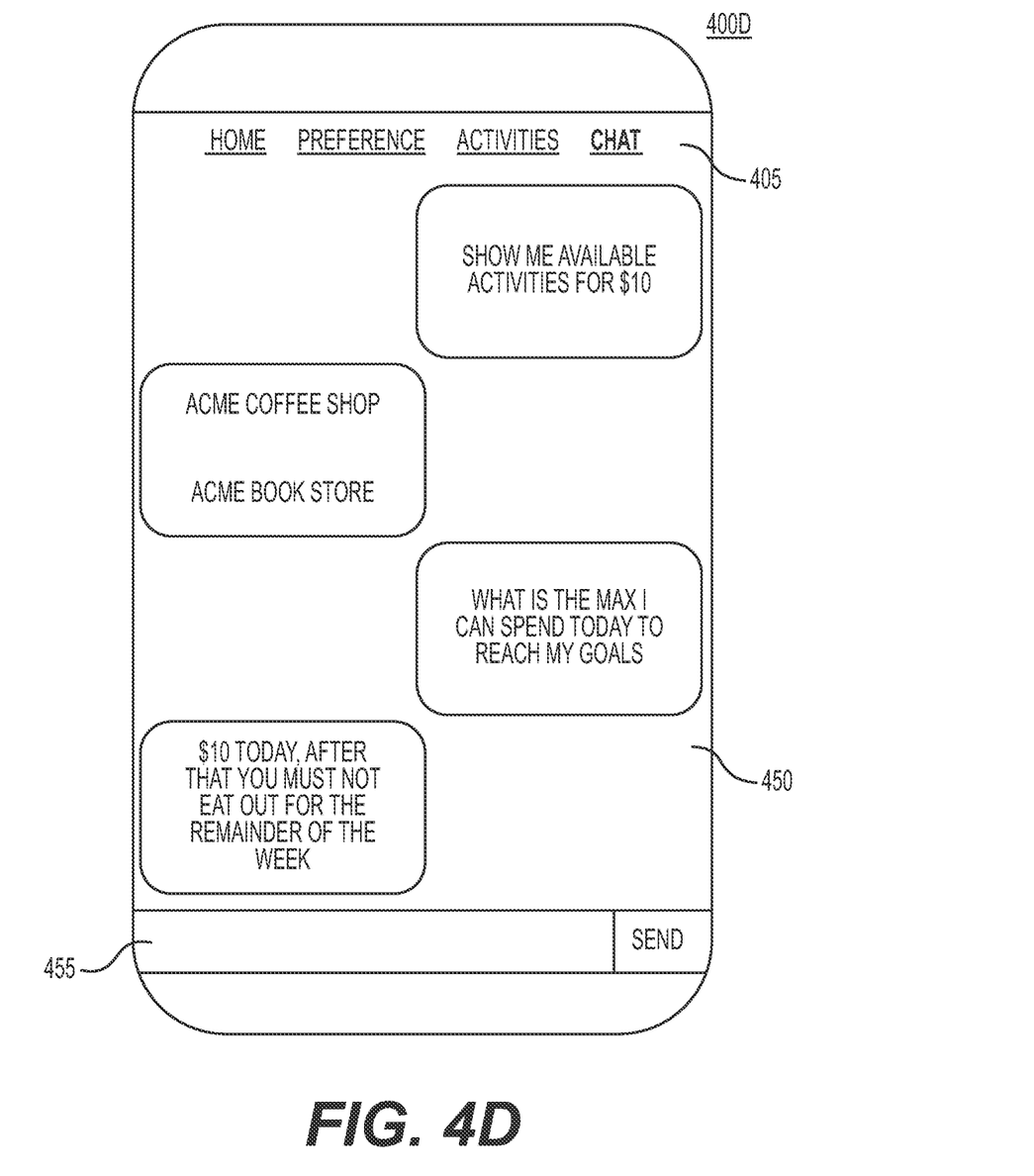

Interface 400D may depict a chat bot feature of the application. The user may navigate to the chat bot feature by interacting with the navigation bar 405. Interface 400D may include chat screen 450, and text bar 455. The chat bot feature may allow the user to interact with the financial manager 110 via text or voice. The user may enter queries related to financial planning and activities via the text bar 455 or via voice and the financial manager 110 may respond with the appropriate results. The chat screen 450 may display a history of interactions between the user and the financial manager 110. For example, the user may request to be shown available activities, and a list of available activities may be displayed to the user in the chat screen 450. Additionally, the user may query financial planning inquiries, for example, how much can the user spend and still meet the financial goals of the user. The financial manager 110 may respond with an appropriate answer after performing an evaluation of the financial preferences of the user and all potential transactions to be conducted by the user.

Figure 5:
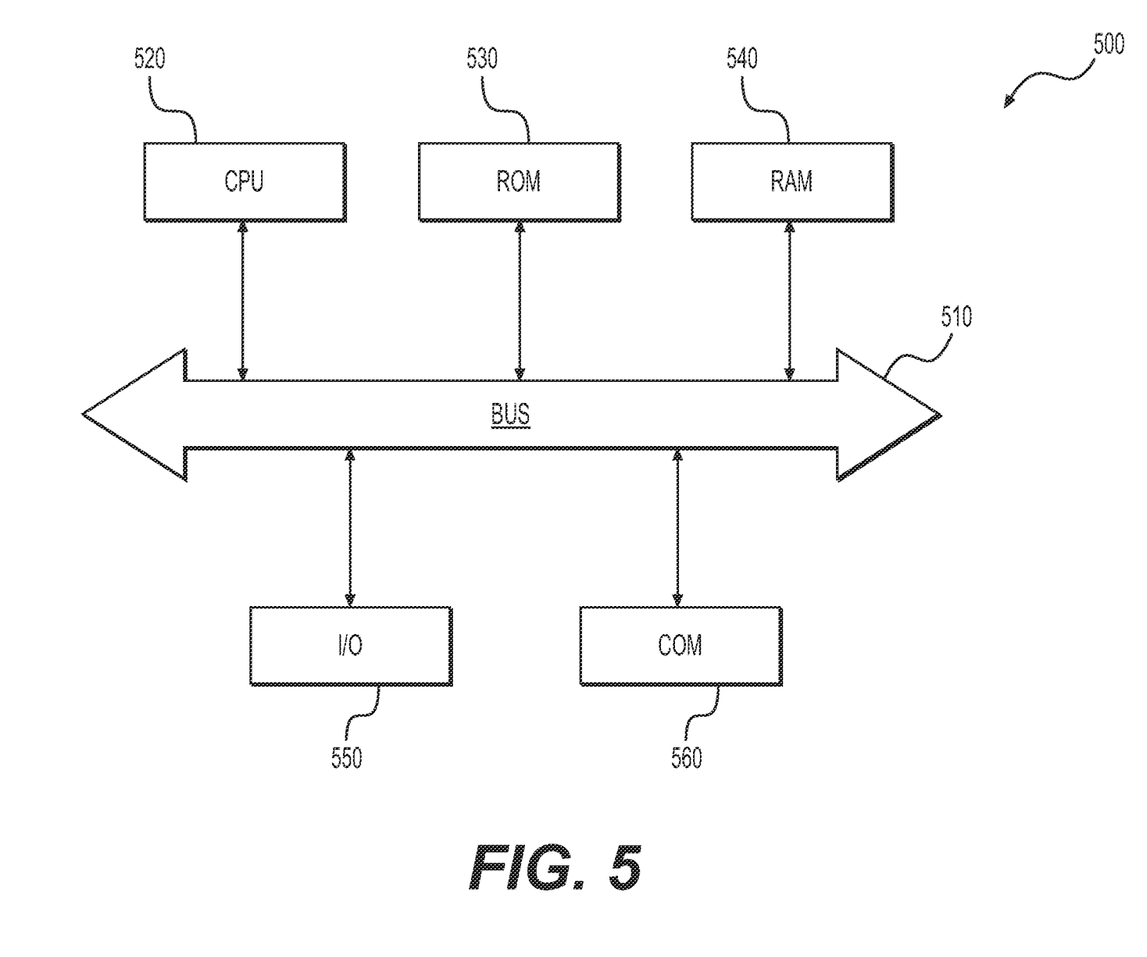
FIG. 5 depicts an exemplary computer device or system, by which embodiments of the present disclosure, or portions thereof, may be implemented

FIG. 5 depicts a high-level functional block diagram of an exemplary computer device or system, in which embodiments of the present disclosure, or portions thereof, may be implemented, e.g., as computer-readable code. Additionally, each of the exemplary computer servers, databases, user interfaces, modules, and methods described above with respect to FIGS. 1-4D can be implemented in/via device 500 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-4D.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-4D, may be implemented using device 500. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 5, device 500 may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multi-processor system, such system operating alone, or in a cluster of computing devices operating in a cluster or server farm. CPU 520 may be connected to a data communication infrastructure 510, for example, a bus, message queue, network, or multi-core message-passing scheme.

Device 500 also may include a main memory 540, for example, random access memory (RAM), and also may include a secondary memory 530. Secondary memory 530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

Device 500 also may include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface 560 may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for providing an adaptive goal management recommendation, the method comprising:
   receiving, by one or more processors, account information regarding a user;
   receiving, by the one or more processors and a chat bot feature of an interface of a user device, a query from the user, the query representing text or user voice data;
   in response to the query, presenting, by the one or more processors and the chat bot feature, a portion of the account information including categorized account information of the user;
   receiving, by the one or more processors and the chat bot feature, at least one goal preference of the user and at least one interests preference of the user;
   determining, by the one or more processors, using a trained machine learning model, one or more activities available to the user based on the at least one goal preference and the at least one interests preference of the user received via the chat bot feature, the trained machine learning model having been trained based on (i) training user data that includes information regarding goal preferences and interests preference data associated with persons other than the user; and (ii) training activities data that includes prior available activities data associated with persons other than the user, to learn relationships between the training user data and the training activities data, such that the trained machine learning model is configured to output one or more activities available to the user upon receipt of the at least one goal preference and the at least one interests preference of the user;
   determining, by the one or more processors, for each of the one or more activities available to the user, a respective estimated influence on the at least one goal preference;
   filtering, by the one or more processors, the one or more activities available to the user with a respective estimated influence greater than a threshold; and
   presenting, by the one or more processors and the chat bot feature, a recommendation of action relating to at least one activity of the filtered one or more activities, the recommendation being presented as a voice notification, text notification, graphic notification, or tactile notification.

2. The computer-implemented method of claim 1, further including:
   assigning a respective expected value to each of the at least one interest preference.

3. The computer-implemented method of claim 2, further including:
   determining a respective value of satisfaction based on a respective monetary cost of each of the filtered one or more activities available to the user and the respective expected value of each of the at least one interest preference.

4. The computer-implemented method of claim 3, further including:
   comparing the determined value of satisfaction to a predetermined threshold of satisfaction; and
   upon determining that the determined value of satisfaction is below the predetermined threshold of satisfaction, removing the one or more activities available to the user with the determined value of satisfaction below the predetermined threshold.

5. The computer-implemented method of claim 1, wherein the presenting of the recommendation of action is further determined based on a user preference.

6. The computer-implemented method of claim 1, further including:
   presenting an updated goal preference after the user performs the filtered one or more activities available to the user; and
   updating the one or more activities available to the user based on the user performing the filtered one or more activities available to the user.

7. The computer-implemented method of claim 1, wherein determining the one or more activities available to the user further includes determining the one or more activities available based on the account information.

8. The computer-implemented method of claim 1, wherein determining the one or more activities available to the user further includes determining the one or more activities available based on the at least one goal preference.

9. The computer-implemented method of claim 1, wherein the categorized account information includes at least one of entertainment, dining, travel, groceries, utilities, mortgage/rent, fitness, health, or miscellaneous.

10. The computer-implemented method of claim 1, wherein the user device includes at least one of a smartphone, a wearable computing device, a tablet computer, a laptop, or a desktop computer.

11. A computer system for providing an adaptive goal management recommendation, the computer system comprising:
    a memory having processor-readable instructions stored therein; and
    at least one processor configured to access the memory and execute the processor-readable instructions, which when executed by the at least one processor configure the at least one processor to perform a plurality of functions, including functions for:
      receiving account information regarding a user;
      receiving, via a chat bot feature of an interface of a user device, a query from the user, the query representing text or user voice data;
      in response to the query, presenting, via the chat bot feature, a portion of the account information including categorized account information of the user;
      receiving, via the chat bot feature, at least one goal preference of the user and at least one interests preference of the user;
      determining, using a trained machine learning model, one or more activities available to the user based on the at least one goal preference and the at least one interests preference of the user received via the chat bot feature, the trained machine learning model having been trained based on (i) training user data that includes information regarding goal preferences and interests preference data associated with persons other than the user; and (ii) training activities data that includes prior available activities data associated with persons other than the user, to learn relationships between the training user data and the training activities data, such that the trained machine learning model is configured to output one or more activities available to the user upon receipt of the at least one goal preference and the at least one interests preference of the user;
      determining, for each of the one or more activities available to the user, a respective estimated influence on the at least one goal preference;
      filtering the one or more activities available to the user with a respective estimated influence greater than a threshold; and
      presenting, via the chat bot feature, a recommendation of action relating to at least one activity of the filtered one or more activities, the recommendation being presented as a voice notification, text notification, graphic notification, or tactile notification.

12. The computer system of claim 11, wherein the functions further include assigning a respective expected value to each of the at least one goal preference.

13. The computer system of claim 12, wherein the functions further include calculating a respective value of satisfaction based on a respective monetary cost of each of the filtered one or more activities available to the user and the respective expected value of each of the at least one goal preference.

14. The computer system of claim 13, further including:
    comparing each respective calculated value of satisfaction to a predetermined threshold of satisfaction; and
    upon determining that a respective calculated value of satisfaction is below the predetermined threshold of satisfaction, removing the one or more activities available to the user with the respective calculated value of satisfaction below the predetermined threshold.

15. The computer system of claim 11, wherein the presenting of the recommendation of action is further determined based on a user preference.

16. The computer system of claim 11, wherein the functions further include:
    presenting an updated goal preference after the user performs the filtered one or more activities available to the user; and
    updating the one or more activities available to the user based on the user performing the filtered one or more activities available to the user.

17. The computer system of claim 11, wherein determining the one or more activities available to the user further includes determining the one or more activities available based on the account information.

18. The computer system of claim 11, wherein determining the one or more activities available to the user further includes determining the one or more activities available based on the at least one interest preference.

19. The computer system of claim 11, wherein the categorizing account information includes at least one of entertainment, dining, travel, groceries, utilities, mortgage/rent, fitness, health, or miscellaneous.

20. A computer-implemented method for providing an adaptive goal management recommendation, the method comprising:
    receiving, by one or more processors, account information regarding a user;
    receiving, by the one or more processors and a chat bot feature of an interface of a user device, a query from the user, the query representing text or user voice data;
    in response to the query, presenting, by the one or more processors and the chat bot feature, a portion of the account information including categorized account information of the user;
    receiving, by the one or more processors and the chat bot feature, at least one goal preference of the user and at least one interests preference of the user;

determining, by the one or more processors, using a trained machine learning model, one or more activities available to the user based on the at least one goal preference and the at least one interests preference of the user received via the chat bot feature, the trained machine learning model having been trained based on (i) training user data that includes information regarding goal preferences and interests preference data associated with persons other than the user; and (ii) training activities data that includes prior available activities data associated with persons other than the user, to learn relationships between the training user data and the training activities data, such that the trained machine learning model is configured to output one or more activities available to the user upon receipt of the at least one goal preference and the at least one interests preference of the user;

determining, by the one or more processors, for each of the one or more activities available to the user, a respective estimated influence on the at least one goal preference;

filtering, by the one or more processors, the one or more activities available to the user with a respective estimated influence greater than a threshold;

determining, by the one or more processors, a respective satisfaction value based on a respective monetary cost of each of the filtered one or more activities available to the user; and presenting, by the one or more processors and the chat bot feature, a recommendation of action based on ranking the determined satisfaction values.

\* \* \* \* \*